(12) United States Patent
Nakano

(10) Patent No.: US 11,073,496 B2
(45) Date of Patent: Jul. 27, 2021

(54) REFERENCE ELECTRODE

(71) Applicant: LAPIS SEMICONDUCTOR CO., LTD., Kanagawa (JP)

(72) Inventor: Kazuhiro Nakano, Nara (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 6 days.

(21) Appl. No.: 16/171,631

(22) Filed: Oct. 26, 2018

(65) Prior Publication Data

US 2019/0128840 A1    May 2, 2019

(30) Foreign Application Priority Data

Oct. 27, 2017 (JP) ................. 2017-208552

(51) Int. Cl.
  *G01N 27/414*  (2006.01)
  *G01N 27/30*   (2006.01)
(52) U.S. Cl.
  CPC ........ *G01N 27/414* (2013.01); *G01N 27/301* (2013.01)

(58) Field of Classification Search
  CPC .................. G01N 27/414; G01N 27/301
  See application file for complete search history.

(56) References Cited

U.S. PATENT DOCUMENTS

2008/0000771 A1\* 1/2008 Kakiuchi ............ G01N 27/301
                                                    204/435

FOREIGN PATENT DOCUMENTS

JP          2012-047647 A     3/2012

\* cited by examiner

*Primary Examiner* — J. Christopher Ball
(74) *Attorney, Agent, or Firm* — Volentine, Whitt & Francos, PLLC

(57) ABSTRACT

A reference electrode including a casing through which one face at one side of a liquid junction that leaches an internal liquid is exposed. The casing is provided with an overhang portion that hangs out on the one face side of the liquid junction and prevents separation of the liquid junction from the casing; and an open portion that leaves a space on the one side of the liquid junction open toward a lateral direction along the one face.

6 Claims, 9 Drawing Sheets

REFERENCE ELECTRODE

CROSS-REFERENCE TO RELATED APPLICATION

This application is based on and claims priority under 35 USC 119 from Japanese Patent Application No. 2017-208552 filed on Oct. 27, 2017, the disclosure of which is incorporated by reference herein.

BACKGROUND

Technical Field

The present disclosure relates to a reference electrode employed to inspect a given place.

Related Art

Known methods of measuring, for example, the pH at a given place include methods which employ an ISFET. This ISFET measures pH based on the electric potential of a reference electrode.

Such reference electrodes are configured with an internal electrode including silver/silver chloride or the like that is immersed in a potassium chloride solution, with the potassium chloride solution being in contact with a substance to be measured via a liquid junction including a porous material.

Japanese Patent Application Laid-Open (JP-A) No. 2012-47647 illustrates one known reference electrode. A liquid junction is provided at a leading end portion of a support tube of this reference electrode. A cylindrical membrane-fixing member is screwed onto the leading end portion of the support tube, and the liquid junction is fixed in place in a state in which a circumferential edge portion of the liquid junction is held between the support tube and a flange portion provided at an end portion of the membrane-fixing member.

In such a reference electrode, a space at the surface of the liquid junction is surrounded by the flange portion. Accordingly, when the leading end portion of the reference electrode is, for example, inserted into a nutrient liquid and pH is measured, bubbles accumulate in the space surrounded by the flange portion.

In such cases, the liquid junction may not be able to make contact with the nutrient liquid, and measurement results may become unstable.

SUMMARY

In view of the above circumstances, the disclosure provides a reference electrode capable of stabilizing measurement results.

A reference electrode according to the disclosure includes a casing through which one face at one side of a liquid junction that leaches an internal liquid is exposed. The casing is provided with an overhang portion and an open portion. The overhang portion hangs out on the one face side of the liquid junction and prevents separation of the liquid junction from the casing. The open portion leaves a space on the one side of the liquid junction open in a lateral direction along the one face.

The disclosure enables measurement results to be stabilized compared with cases in which a surface of a liquid junction is surrounded by a flange.

BRIEF DESCRIPTION OF THE DRAWINGS

Exemplary embodiments of the present disclosure will be described in detail based on the following figures, wherein.

DETAILED DESCRIPTION

First Embodiment

Figure 1:
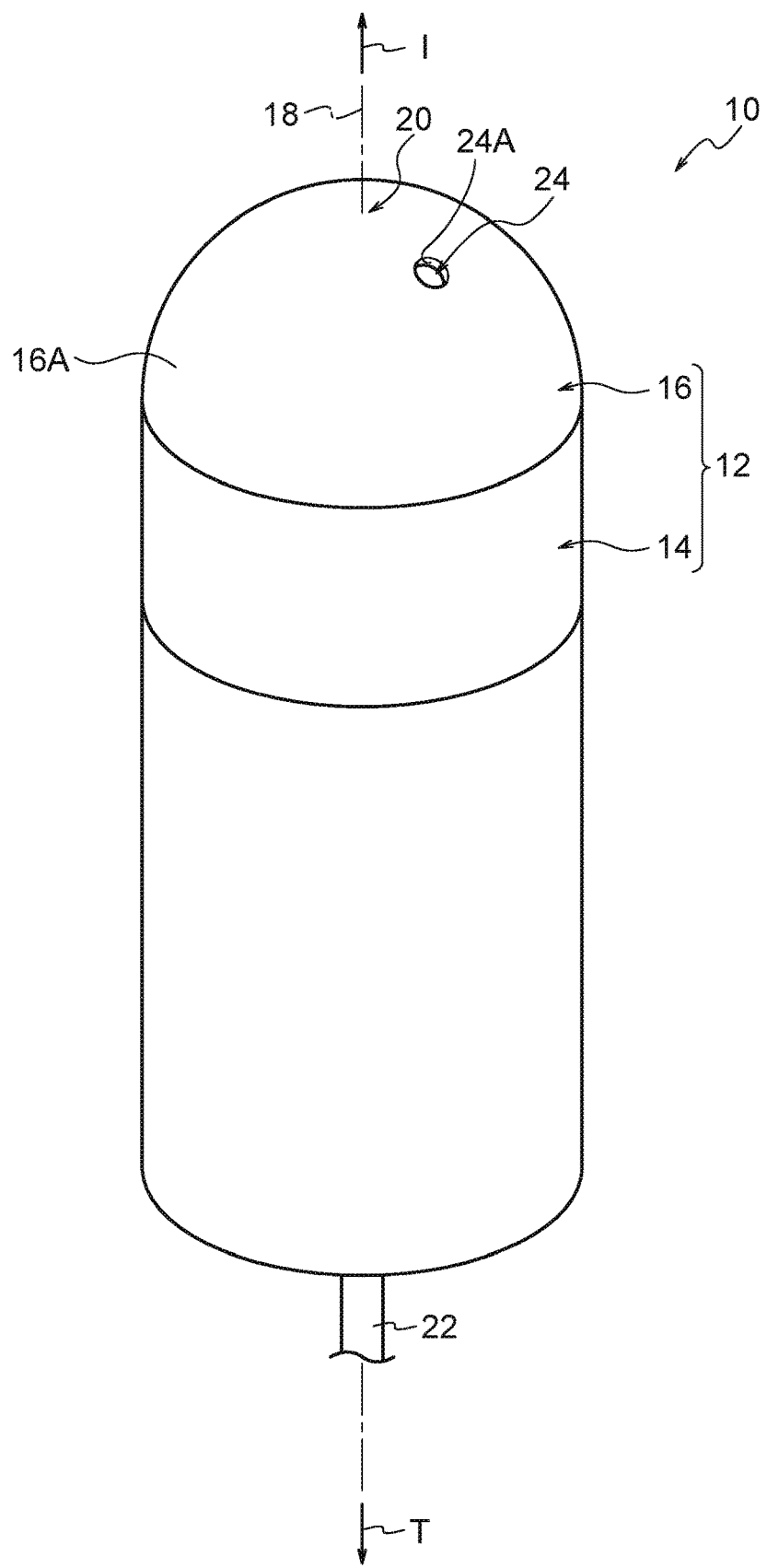
FIG. 1 is a perspective view illustrating a reference electrode according to a first embodiment.

Explanation follows regarding a first embodiment, with reference to the drawings. FIG. 1 is a diagram illustrating a reference electrode 10 according to a first embodiment. The reference electrode 10 is, for example, when measuring the pH of soil or a hydroponic nutrient liquid for raising crops.

The reference electrode 10 is employed in combination with an ion-sensitive field-effect transistor (ISFET), this being a measurement sensor. The ISFET measures pH based on the electric potential of the reference electrode 10. The ISFET may be provided at any place in a casing 12 of the reference electrode 10.

Soil or nutrient liquid pH values are managed on the basis of these measurement values to create an environment suited to crop growth.

The casing 12 of the reference electrode 10 is provided with a bottomed, cylindrical body 14 and a hemispherical head 16. The head 16 is provided at one side I of the body 14, and closes off an opening in a leading end of the body 14. An apex 20 of the head 16 of the casing 12 is defined at a location positioned on a center line 18 of the casing 12 where the head 16 projects furthest toward the one side I. A head surface 16A curves toward another side T, this being on the body 14 side of the head 16, on progression from the apex 20 toward an outer circumferential portion. A cable 22 for communication extends out from a base end of the body 14 of the casing 12, this being a bottom portion of the body 14.

In use, the reference electrode 10 is buried in soil or inserted into a nutrient liquid with the head 16 pointed downward. An opening 24 is formed at a location on the head 16 offset toward an outer circumferential side from the apex 20. An edge of the opening 24 is beveled to form a beveled portion 24A.

Figure 2:
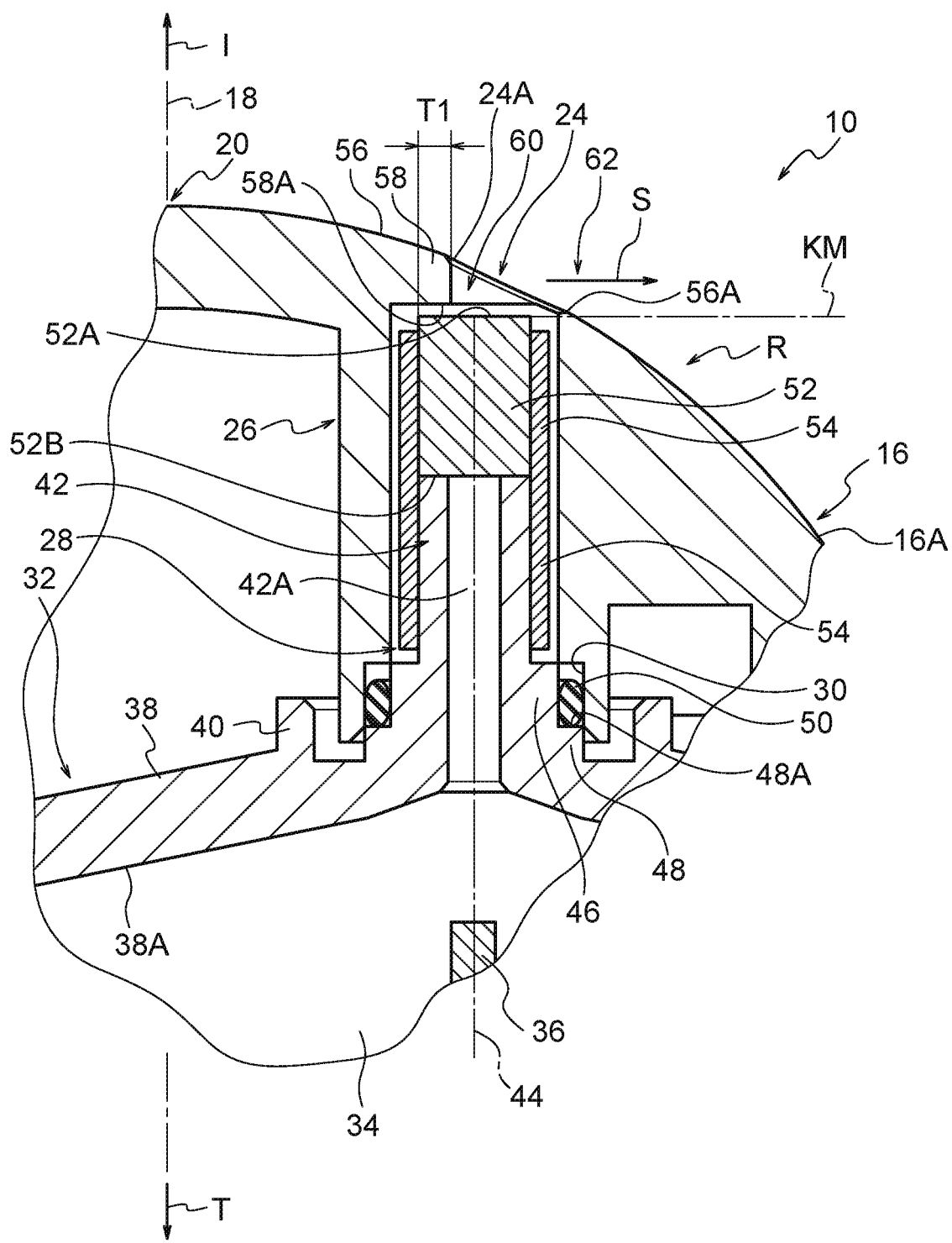
FIG. 2 is a cross-sectional view illustrating relevant parts of FIG. 1.

As illustrated in FIG. 2, a projection 26 that projects toward the inside of the casing 12 is formed to the backside of the head 16 where the opening 24 is provided. A circular seating hole 28 is formed in the projection 26. In FIG. 2, the one side I of the seating hole 28, indicating an upper side, is in communication with the outside via the opening 24. Also in FIG. 2, the another side T of the seating hole 28, indicating a lower side, is open. A mounting hole 30 is formed in an end face of the projection 26 so as to surround the seating hole 28.

A container-shaped tank 32 is provided inside the casing 12 of the reference electrode 10. The inside of the tank 32 is filled with an internal liquid 34. An internal electrode 36 is disposed in the internal liquid 34. The internal electrode 36 is connected to a non-illustrated controller. Examples of the internal liquid 34 include a potassium chloride (KCl) solution, and examples of the material of the internal electrode 36 include silver/silver chloride (Ag/AgCl).

A ring portion 40 that projects in a ring shape is formed to an upper face 38 of the tank 32. A cylindrical tube portion 42 extends out toward the one side I from a central portion of the ring portion 40. A communication hole 42A inside the tube portion 42 is in communication with the inside of the tank 32. The communication hole 42A is configured such that the internal liquid 34 inside the tank 32 is able to be supplied from a leading end of the tube portion 42.

An inner face 38A of the upper face 38 of the tank 32 is inclined toward the one side I, this being the leading end side of the tube portion 42, on progression from the outer circumferential portion to the communication hole 42A. The communication hole 42A is disposed along an extension line 44 from the internal electrode 36, and the liquid junction 52 is also disposed along the extension line 44. Thus, when the reference electrode 10 is used with the head 16 pointed downward, configuration is such that the internal liquid 34 collects in the communication hole 42A, and configuration is such that the internal electrode 36 touches the internal liquid 34 that has collected in the communication hole 42A even in a state in which the internal liquid 34 has been reduced.

A thick portion 46 that is thicker than the tube portion 42 is formed to a base end portion of the tube portion 42 on the tank 32 side of the tube portion 42. A large-diameter portion 48 that has a larger diameter than the thick portion 46 is formed on the base end side of the thick portion 46. A step 48A is thus formed between the large-diameter portion 48 and the thick portion 46, restricting the amount of intrusion of an O-ring 50 that is fitted to the outside of the thick portion 46.

The liquid junction 52 is configured from a porous material having a circular column shape, and is provided at the leading end of the tube portion 42. The outer diameter of the liquid junction 52 has substantially the same dimensions as the outer diameter of the tube portion 42, and is set from 1 mm to 5 mm. The tube portion 42 and the liquid junction 52 are surrounded by heat-shrink tubing 54. The tubing 54 shrinks when heat is applied thereto, whereby the tube portion 42 and the liquid junction 52 are fixed together by the tubing 54 without employing an adhesive agent.

In this fixed state, one face 52A on the one side I of the liquid junction 52 is exposed, and another face 52B on the another side T of the liquid junction 52 abuts an end face of the tube portion 42 of the tank 32. Configuration is thus such that internal liquid 34 from the tube portion 42 of the tank 32 is able to be supplied to the liquid junction 52 from the another face 52B and leached from the one face 52A.

The tube portion 42 to which the liquid junction 52 is attached is inserted into the seating hole 28 from the inside of the head 16, and the liquid junction 52 is seated in the seating hole 28. In this state, the thick portion 46 provided to the base end portion of the tube portion 42 is inserted into the mounting hole 30 provided in the projection 26 of the head 16, and the O-ring 50 fitted to the outside of the thick portion 46 is placed in close contact with an outer circumferential face of the thick portion 46 and an inner circumferential face of the mounting hole 30, thus ensuring liquid-tightness.

Figure 3:
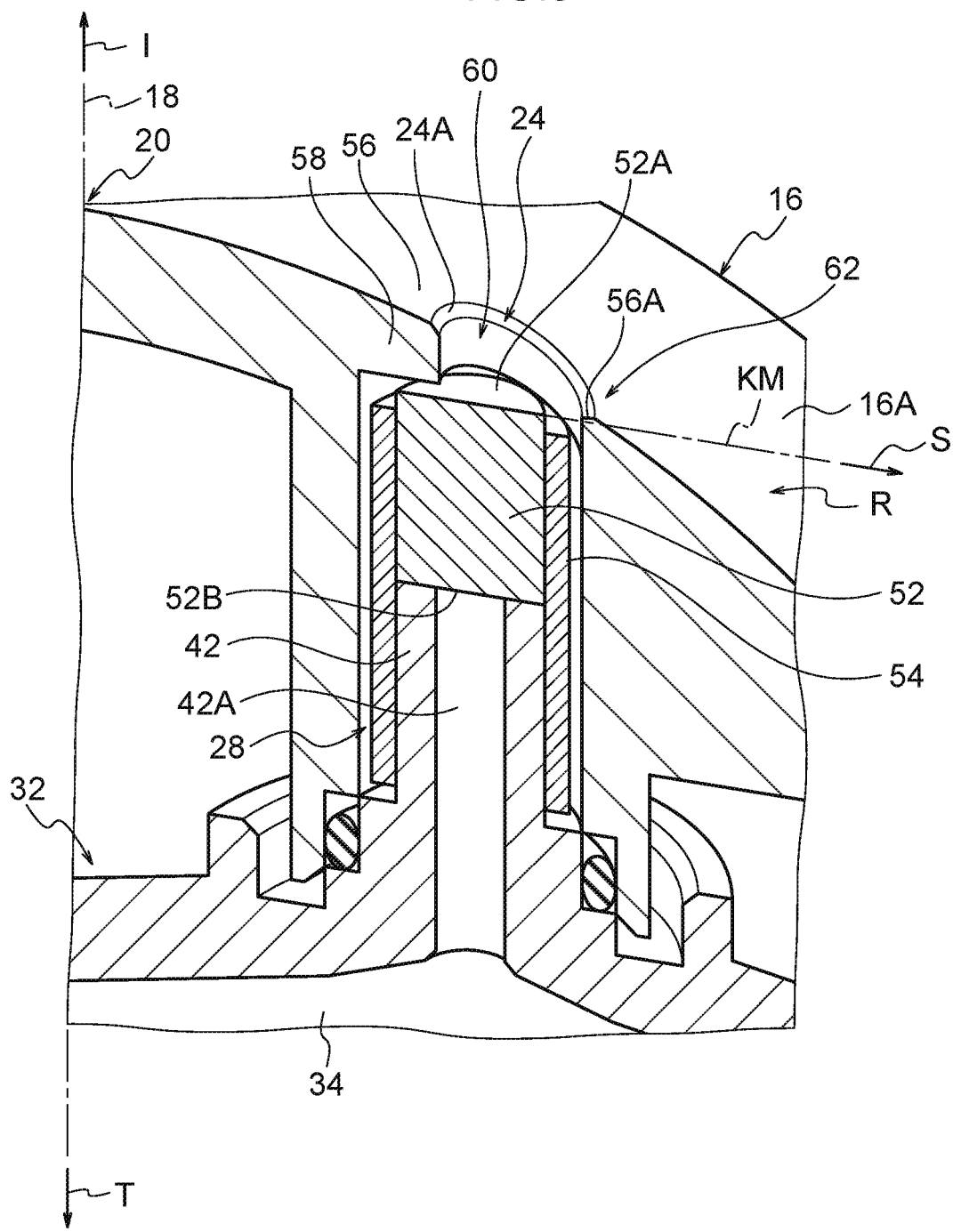
FIG. 3 is a perspective cross-sectional view corresponding to FIG. 2.

The one face 52A of the liquid junction 52 is disposed in close proximity to the opening 24 provided in the head 16. As also illustrated in FIG. 3, the one face 52A on the one side I of the liquid junction 52 that leaches the internal liquid 34 is exposed to the head 16 configuring the casing 12. Configuration is thus such that the internal liquid 34 is able to be leached into soil or a nutrient liquid, these being substances being measured, via the liquid junction 52.

Figure 4:
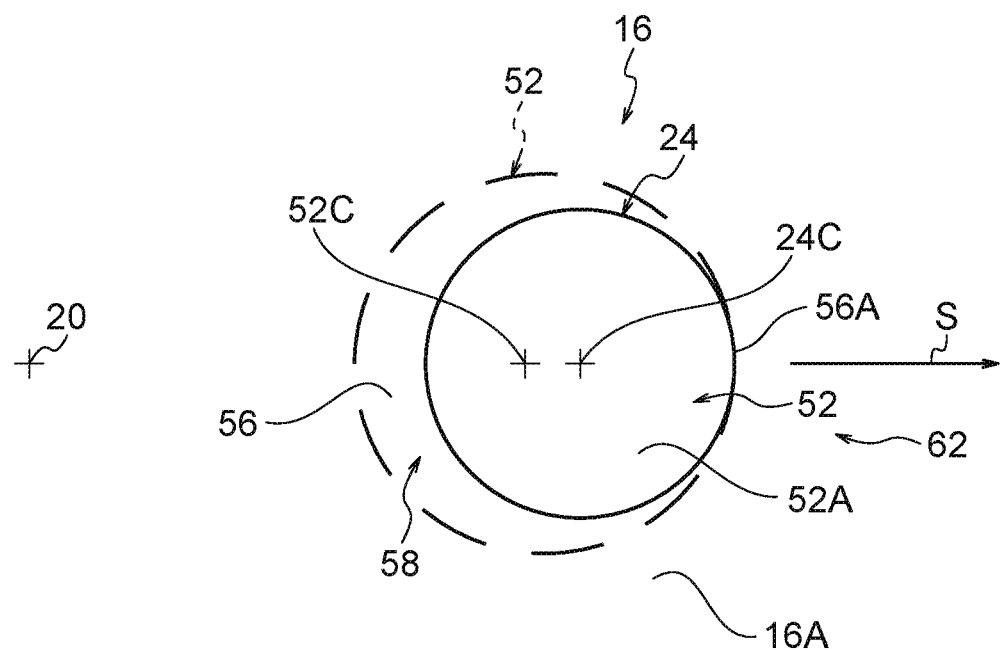
FIG. 4 is a plan view illustrating an opening according to a first embodiment.

As illustrated in FIG. 4, the one face 52A of the liquid junction 52 formed in a circular column shape is circular, and the opening 24 that exposes the one face 52A is also circular. A center 52C of the circularly formed one face 52A and a center 24C of the circularly formed opening 24 are disposed at positions offset from one another. The opening 24 is eccentrically disposed with respect to the one face 52A, in a direction toward the outer circumferential side and away from the apex 20 of the casing 12.

As illustrated in FIGS. 2 to 4, part of an opening edge 56 of the opening 24 hangs out over the liquid junction 52 and covers the one face 52A of the liquid junction 52. Thus, an overhang portion 58 that hangs out across the one face 52A of the liquid junction 52 and prevents separation of the liquid junction 52 from the seating hole 28 is formed by the opening edge 56 of the opening 24.

As illustrated in FIGS. 2 and 3, the opening 24 is established in the spherically formed head surface 16A. On the opening edge 56 of the opening 24, locations toward the outer circumferential side away from the apex portion 20 are positioned on the another side T of locations on the apex portion 20 side of the opening 24.

Thus, when an imaginary plane KM is envisaged making surface contact with the one face 52A of the liquid junction 52, a rounded surface region R that does not project to the one side I of the imaginary plane KM is formed at the outer circumferential side of an outermost location 56A on the opening edge 56 furthest away from the apex 20. Due to this rounded surface region R, an open portion 62 that leaves a space 60 on the one side I of the liquid junction 52 open in a lateral direction S along the one face 52A is formed in the head surface 16A. Note that in the present embodiment, configuration is such that the outermost location 56A on the opening edge 56 is positioned on the imaginary plane KM.

As illustrated in FIG. 2, the outermost location 56A is positioned on the another side T of an inner face 58A on the liquid junction 52 side of the overhang portion 58, and the inner face 58A of the overhang portion 58 is positioned on the one side I of the imaginary plane KM. Thus, even in cases in which the amount that the liquid junction 52 is inserted into the seating hole 28 fluctuates due to mold tolerance or the like, configuration is such that the outermost location 56A is able to maintain a state positioned on the another side T of the one face 52A of the liquid junction 52.

Note that in a state in which the liquid junction 52 has been inserted to the bottom of the seating hole 28 and the one face 52A abuts the inner face 58A of the overhang portion 58, the one face 52A of the liquid junction 52 is positioned on the one side I of the outermost location 56A.

Operation and Effects

Explanation follows regarding the operation of the present embodiment.

Figure 5:
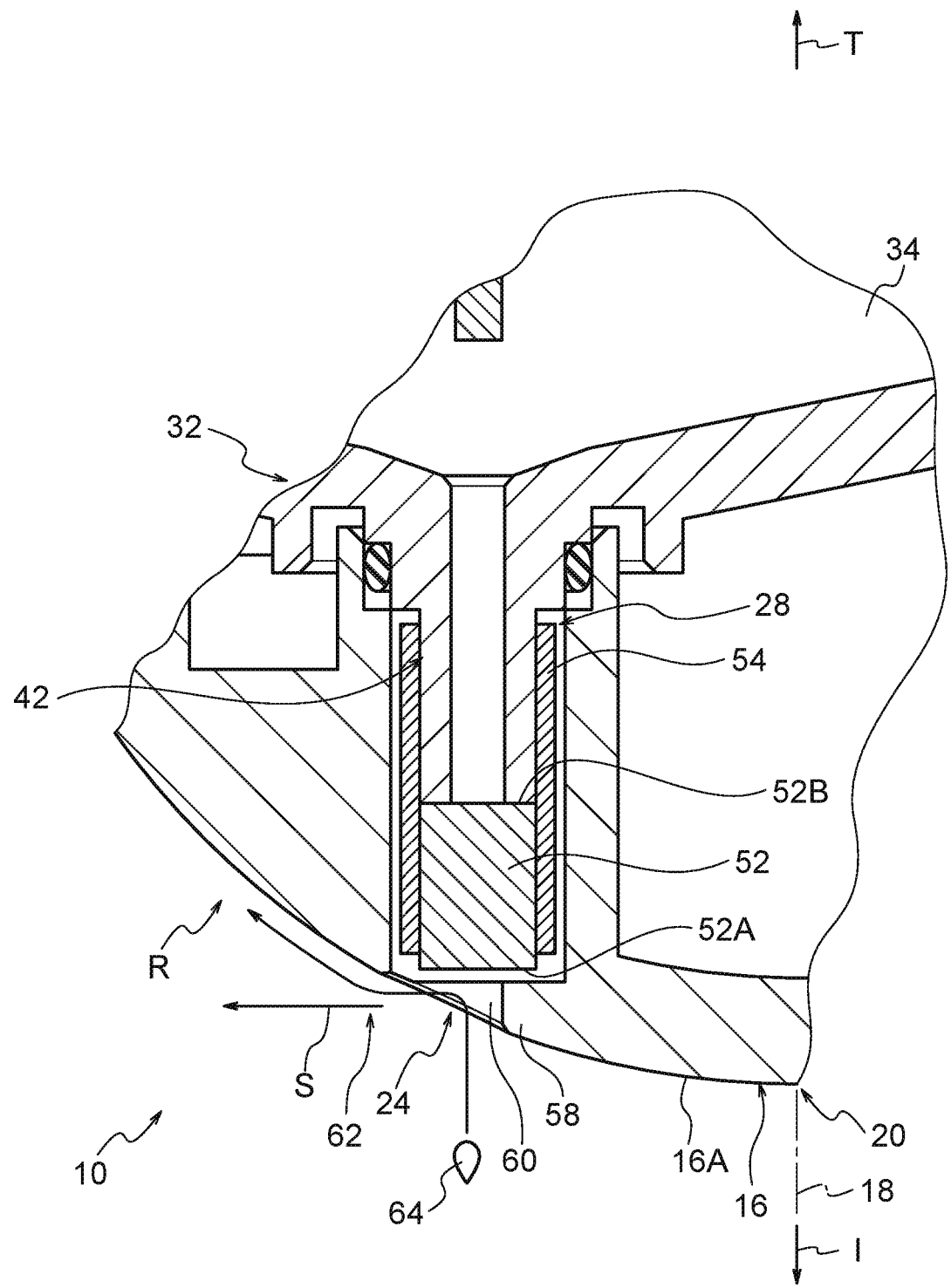
FIG. 5 is an explanatory diagram illustrating an effect according to the first embodiment.

As illustrated in FIG. 5, when measuring the pH of a hydroponic nutrient liquid, the head 16 of the reference electrode 10 is inserted into the nutrient liquid pointed downward. The liquid junction 52 provided to the head 16 is provided at a position set back from the head surface 16A, and the recessed space 60 is formed on the one side I of the liquid junction 52. As a result, when the space 60 is surrounded by a flange, bubbles 64, which have been accumulated in the space, can not escape.

However, in the present embodiment, the head 16 configuring the casing 12 is formed with the open portion 62 that leaves the space 60 on the one side I of the liquid junction 52 open in the lateral direction S along the one face 52A. Accordingly, even if bubbles 64 have entered into the space 60, the bubbles 64 are able to be released from the open portion 62 along the lateral direction S.

Thus, since the internal liquid 34 is able to be leached into the nutrient liquid from the liquid junction 52, measurement results employing the reference electrode 10 are able to be stabilized compared with cases in which the bubbles 64 impede leaching of the internal liquid 34 into the nutrient liquid.

It is thought that if the diameter of the liquid junction 52 is increased such that the surface area of the one face 52A is made sufficiently large, it would be possible to reduce the effect of bubbles 64 on measurement results even if a few bubbles 64 is present. However, when the surface area of the one face 52A is increased, the amount of leached internal liquid 34 increases, and the useable life of the reference electrode 10 will be short.

To resolve this, it is conceivable to reduce the diameter of the liquid junction 52 and fix the liquid junction 52 to the casing 12 using an adhesive agent. However, in such cases, new issues may arise, such as the adhesive agent entering into the liquid junction 52 due to capillary action such that the passageway for the internal liquid 34 is narrowed.

However, in the present embodiment, the head 16 is provided with the overhang portion 58 that hangs out on the one face 52A side of the liquid junction 52 seated in the seating hole 28, whereby separation of the liquid junction 52 is prevented. Accordingly, even if a liquid junction 52 with a small outer diameter of 5 mm is employed in the present embodiment, it is possible to extend the life of the reference electrode 10 while preventing the liquid junction 52 from falling out unexpectedly.

A configuration is also conceivable in which the liquid junction 52 is processed into a protruding shape having a small-diameter portion projecting from the casing 12 and a large-diameter portion disposed inside the casing 12 so as to avoid falling-out of the liquid junction 52 and the accumulation of bubbles 64. However, in such cases, the cost of processing the liquid junction 52 is increased.

In contrast thereto, in the present embodiment, the liquid junction 52 is given a simple, circular column shape, whereby both a fall-out-preventing effect and measurement result stabilization can be simultaneously obtained while reducing costs.

In the present embodiment, the rounded surface region R, which does not project to the one side I of the one face 52A of the liquid junction 52, is set on the head surface 16A of the casing 12 at a part along a circumferential direction around the one face 52A to form the open portion 62.

Accordingly, as illustrated in FIG. 5, bubbles 64 discharged through the open portion 62 from the space 60 on the one side I of the liquid junction 52 are able to be smoothly released along the rounded-surface-shaped head surface 16A.

As a result, when the reference electrode 10 is buried in soil when managing underground pH, even in cases in which the grains of dirt are of large diameter, the one face 52A of the liquid junction 52 is able to easily make contact with the dirt, enabling the accuracy of pH measurements employing the reference electrode 10 to be improved.

Further, in the present embodiment, the opening 24 is eccentrically disposed with respect to the one face 52A of the liquid junction 52 seated in the seating hole 28, enabling the overhang portion 58 to be formed by part of the opening edge 56 of the opening 24.

Accordingly, configuration is able to be simplified compared with cases in which the overhang portion 58 is provided separately to the casing 12.

Further, the tube portion 42 of the tank 32 for supplying the internal liquid 34 to the liquid junction 52 abuts the another face 52B on the another side T of the liquid junction 52 seated in the seating hole 28 of the casing 12. This enables retreat of the liquid junction 52 from the opening 24 toward the another side T to be suppressed.

As a result, so long as the another face 52B of the liquid junction 52 is pressed in by the tube portion 42 of the tank 32 until the one face 52A of the liquid junction 52 abuts the overhang portion 58, the liquid junction 52 is able to be retained in state held between the overhang portion 58 and the tube portion 42.

Further, the liquid junction 52 is fixed to the tube portion 42 of the tank 32 by the tubing 54. Accordingly, a liquid junction 52 with a small diameter of 5 mm or less can be easily seated in the seating hole 28, and separation of the liquid junction 52 from the tube portion 42 is able to be prevented when the liquid junction 52 is seated.

Second Embodiment

Figure 6:
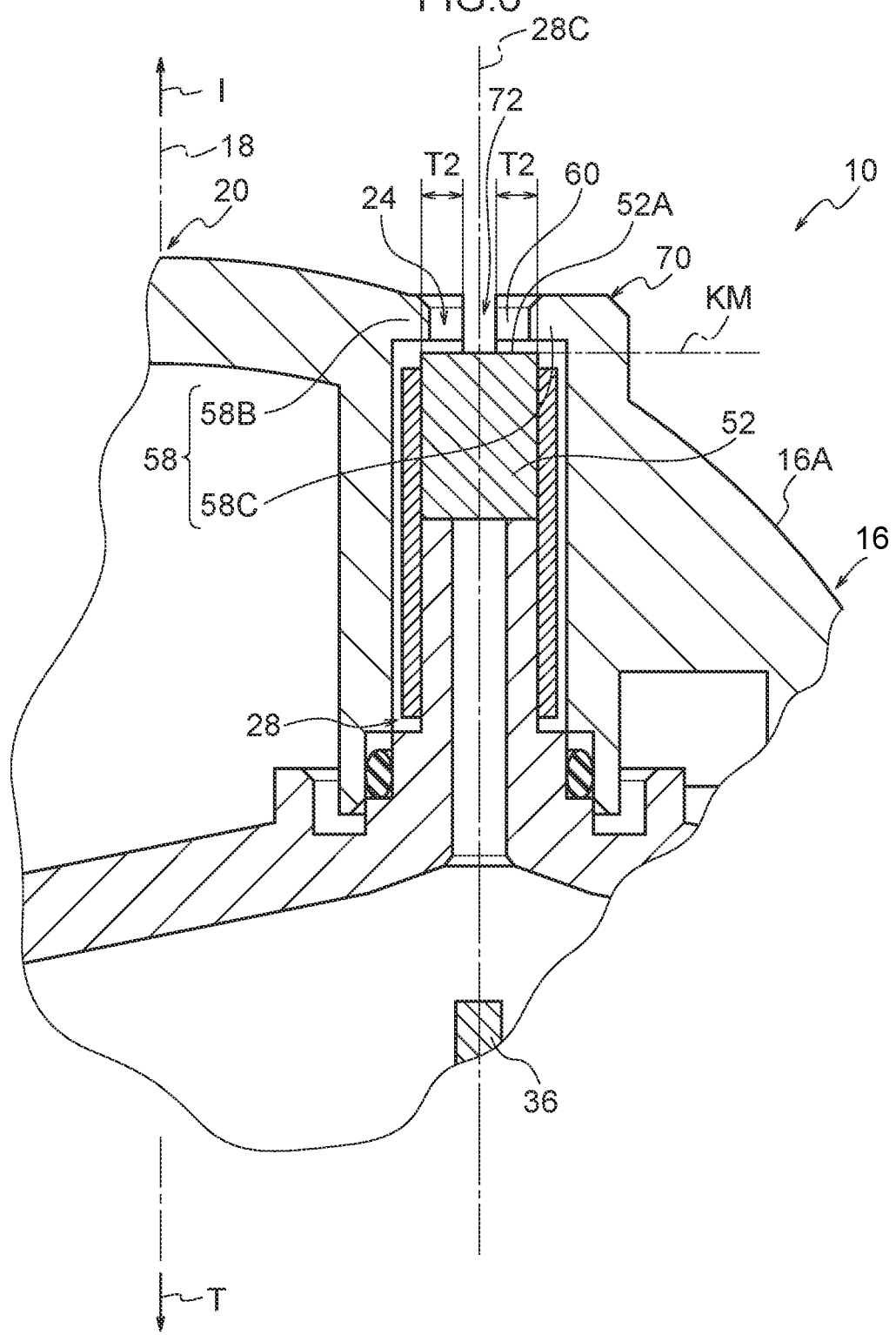
FIG. 6 is a cross-sectional view illustrating relevant parts, corresponding to that in FIG. 2, of a reference electrode according to a second embodiment.
Figure 7:
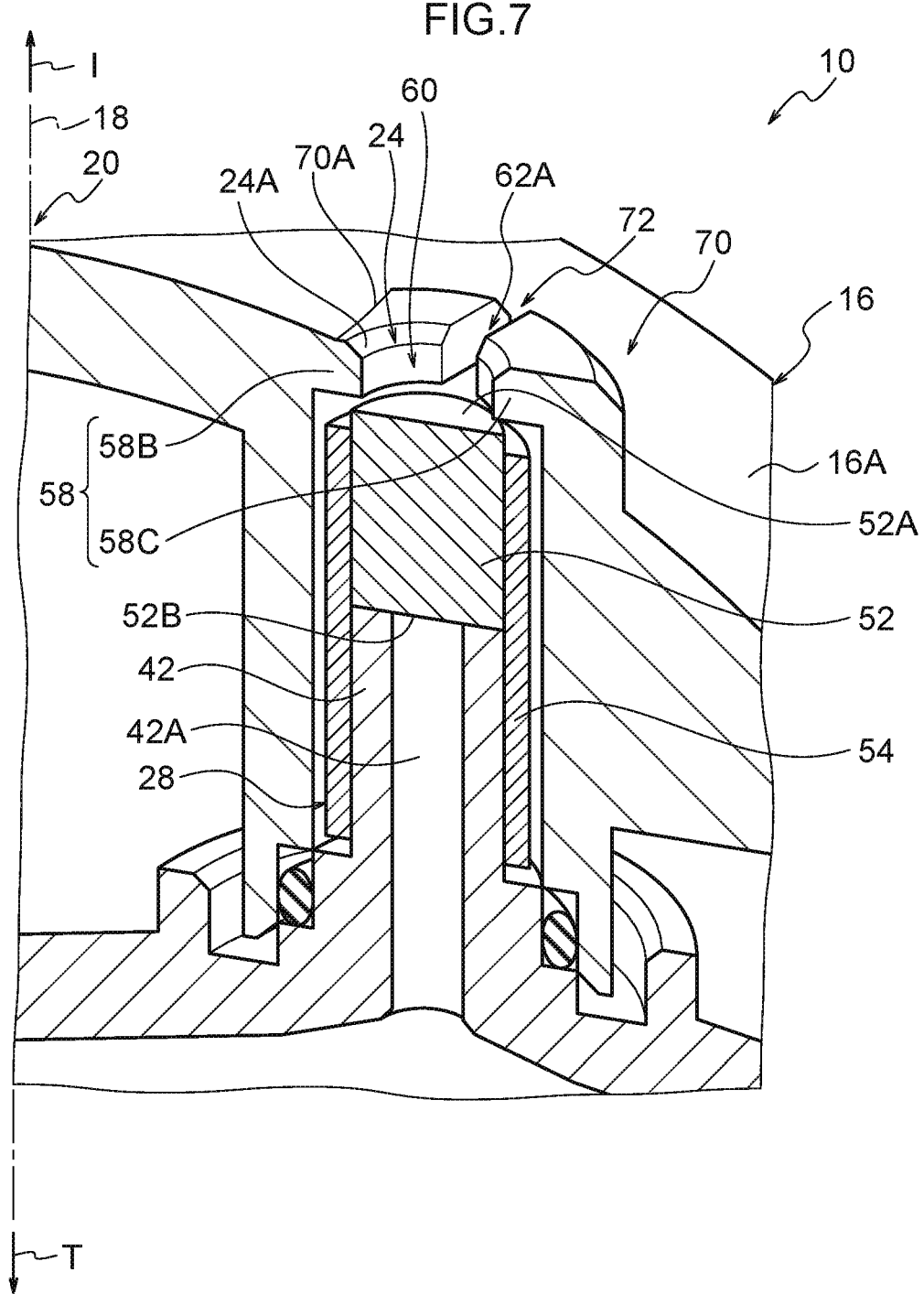
FIG. 7 is a perspective cross-sectional view corresponding to FIG. 5.
Figure 8:
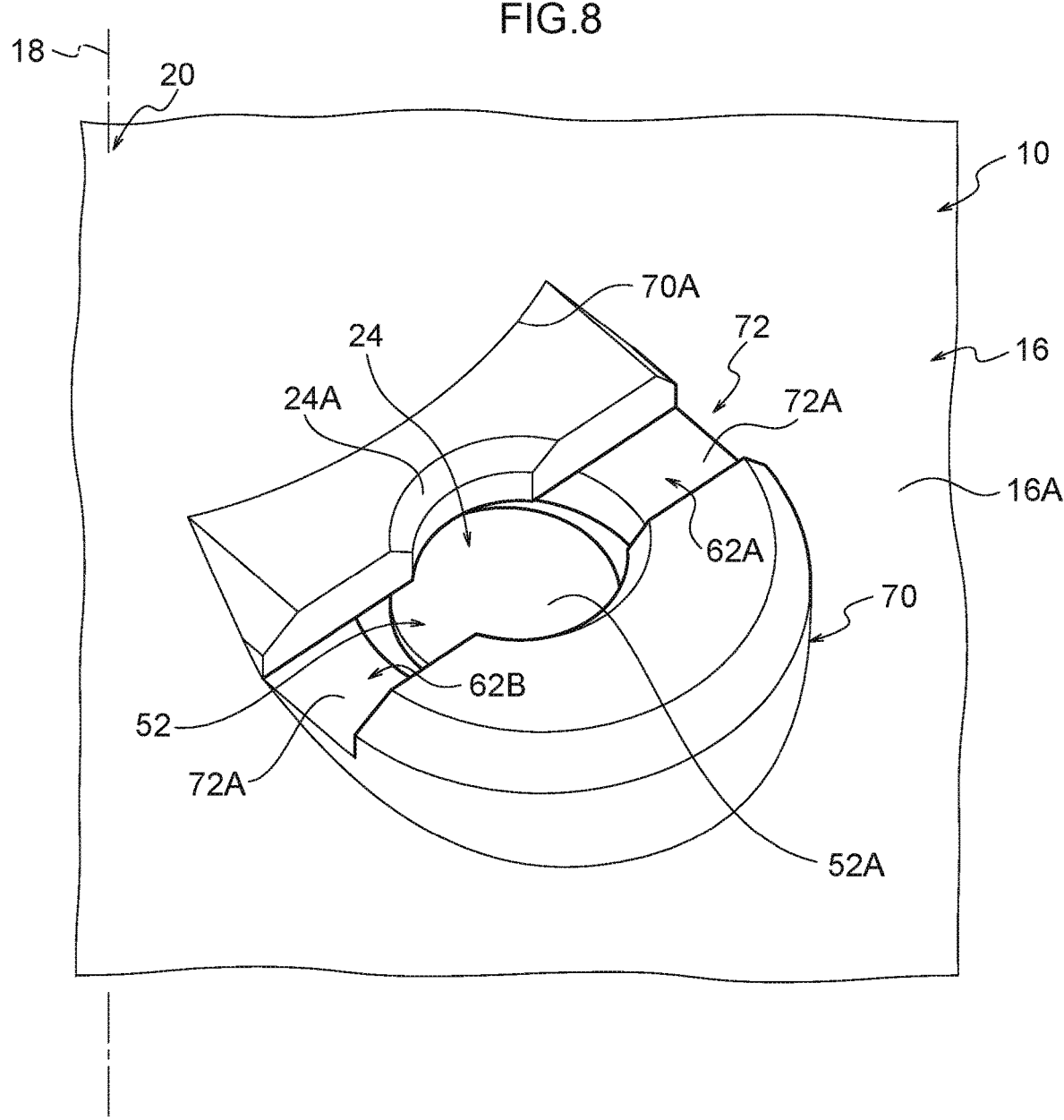
FIG. 8 is a perspective view illustrating relevant parts of a reference electrode according to the second embodiment.

FIGS. 6 to 8 illustrate a reference electrode 10 according to a second embodiment. Portions that are the same as, or equivalent to, those in the first embodiment are appended with the same reference numerals and explanation thereof will not be given. Explanation follows for only those portions that differ from the first embodiment.

Namely, a circular-arc-shaped protrusion 70 is formed to the head surface 16A around the seating hole 28. An edge 70A of the protrusion 70 on the apex 20 side of the protrusion 70 is integrally formed to the head surface 16A (see FIG. 8).

As illustrated in FIGS. 6 and 7, an overhang portion 58 that hangs out toward a hole center 28C passing through the seating hole 28 is integrally formed to the protrusion 70, and the opening 24 is provided at the inside of the overhang portion 58.

As illustrated in FIG. 8, the protrusion 70 is formed with a groove 72 that cuts across the protrusion 70. As illustrated in FIGS. 6 and 7, the groove 72 divides the overhang portion 58 into a first overhang portion 58B on the apex 20 side of the overhang portion 58, and a second overhang portion 58C on the side of the overhang portion 58 further away from the apex 20. The first overhang portion 58B and the second overhang portion 58C are disposed facing one another.

Further, as illustrated in FIG. 8, a groove bottom face 72A of the groove 72 formed between the two overhang portions 58B, 58C is formed at a position that does not project to the one side I of the imaginary plane KM making surface contact with the one face 52A of the liquid junction 52 (see, for example, FIGS. 2 and 3). Specifically, the groove bottom face 72A is formed on the imaginary plane KM. A first open portion 62A and a second open portion 62B are thus formed that leave a space 60 on the one side I of the liquid junction 52 that is formed between the two overhang portions 58B, 58C open in lateral directions along the one face 52A.

The present embodiment, configured as described above, is able to achieve similar operation and effects to that of the first embodiment.

Further, in the present embodiment, separation of the liquid junction 52 is able to be prevented by the first overhang portion 58B and the second overhang portion 58C, which are disposed facing one another. Accordingly, an abutting amount T2 (abutting length or surface area) over which the first overhang portion 58B and the second overhang portion 58C abut the liquid junction 52, as illustrated in FIG. 6, is able to be made greater than an abutting amount T1 (abutting length or surface area) over which the single overhang portion 58 abuts the liquid junction 52, as illustrated in FIG. 2. This enables a separation-preventing effect to be increased for the liquid junction 52.

Third Embodiment

Figure 9:
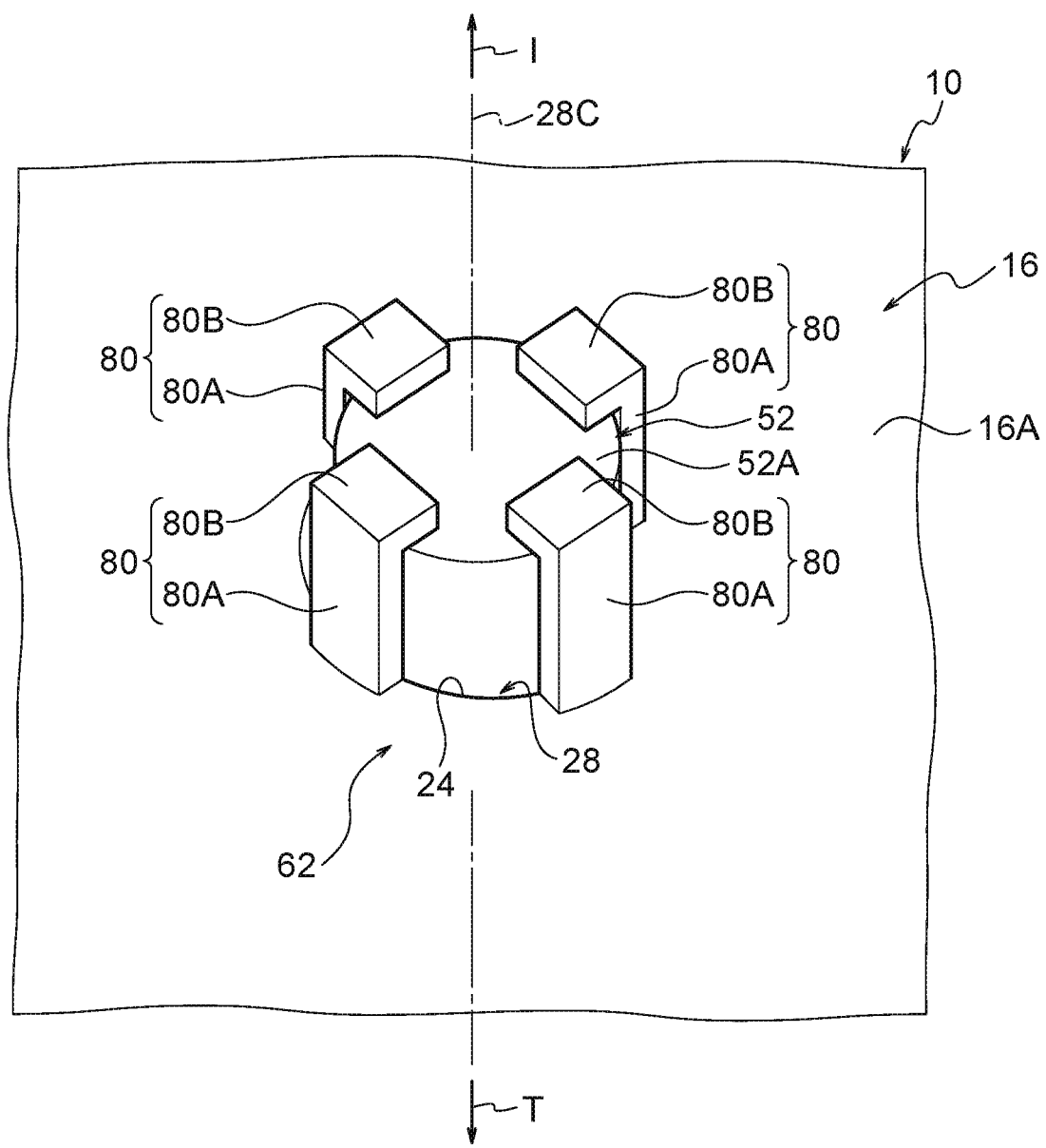
FIG. 9 is a perspective view illustrating relevant parts of a reference electrode according to a third embodiment.

FIG. 9 illustrates a reference electrode 10 according to a third embodiment. Portions that are the same as, or equivalent to, those in the first embodiment are appended with the same reference numerals and explanation thereof will not be given. Explanation follows for only those portions that differ from the first embodiment.

In the reference electrode 10 according to the present embodiment, the seating hole 28 penetrates through the head surface 16A, and the opening 24 is formed at a terminal end of the seating hole 28. Four hooks 80 project from an outer circumferential portion of the opening 24. Each of the hooks 80 is provided with a stand-out portion 80A that stands out from the head surface 16A, and with an overhang portion 80B that extends out from the stand-out portion 80A toward the hole center 28C passing through the seating hole 28.

The liquid junction 52 projects from the opening 24 formed by the seating hole 28, and separation of the liquid junction 52 is prevented by the overhang portions 80B of the hooks 80. Thus, when an imaginary plane is envisaged making surface contact with the one face 52A of the liquid junction 52, a region that does not project to the one side I of the imaginary plane is set on the head surface 16A to form the open portion 62.

The present embodiment is also able to achieve similar operation and effects to that of the first embodiment.

Further, in the present embodiment, since the liquid junction 52 projects from the head surface 16A, the internal liquid 34 is also able to be leached from a circumferential face of the liquid junction 52.

Note that in each of the embodiments, although explanation is given using an example in which the opening 24 exposing the liquid junction 52 is provided in a spherical face, there is no limitation thereto. For example, the opening 24 may be provided in a flat face or in an inclined face.

Further, in the present embodiment, although the opening 24 is provided in the spherically formed head surface 16A to form the open portion 62, there is no limitation thereto. For example, a face of a wall surrounding an outer circumferential portion of the one face 52A of the liquid junction 52 may be provided with a through-hole open in a lateral direction S to provide an open portion 62 that leaves the space 60 on the one side I of the liquid junction 52 open in a lateral direction S along the one face 52A.

What is claimed is:

1. A reference electrode comprising a casing through which one face at one side of a liquid junction that leaches an internal liquid is exposed, the casing comprising:
   an overhang portion that hangs out on the one face side of the liquid junction and covers a part of an outer circumferential portion of the one face side of the liquid junction to prevent separation of the liquid junction from the casing; and
   an open portion, disposed at the one side of the liquid junction, and which is at a portion of the casing in which the overhang portion does not cover the outer circumferential portion of the one face side of the liquid junction, and at which a region of the casing does not project to the one side of the one face of the liquid junction, so that a space is formed between the liquid junction and the casing along a first direction parallel to the one face.

2. The reference electrode according to claim 1, wherein the region of the casing that does not project to the one side of the one face of the liquid junction is set on a surface of the casing at a part along a circumferential direction around the one face to form the open portion.

3. The reference electrode according to claim 1, wherein the casing further comprises another overhang portion, wherein the overhang portion and the another overhang portion are provided facing one another; and
   the open portion leaves the space on the one side of the liquid junction that is formed between the overhang portion and the another overhang portion open along the first direction parallel to the one face.

4. The reference electrode according to claim 1, wherein the one face of the liquid junction and an opening provided in the casing through which the one face is exposed are circular, the opening being eccentrically disposed with respect to the one face so that the overhang portion is formed by an opening edge of the opening.

5. The reference electrode according to claim 1, wherein the liquid junction is seated in a seating hole formed in the casing; and
   a tube portion of a tank inserted into the seating hole for supplying the internal liquid to the liquid junction abuts another face on another side of the liquid junction.

6. The reference electrode according to claim 5, wherein the tube portion of the tank and the liquid junction are fixed together by a tube that surrounds the tube portion and the liquid junction.

* * * * *